US008869925B2

(12) United States Patent
Ogawa (10) Patent No.: US 8,869,925 B2
(45) Date of Patent: Oct. 28, 2014

(54) HEAT-EXCHANGER PROTECTION STRUCTURE (75) Inventor: Jun Ogawa, Saitama (JP)

(73) Assignee: Calsonic Kansei Corporation, Saitama-ken (JP)

( * ) Notice: Subject to any disclaimer, the term of this patent is extended or adjusted under 35 U.S.C. 154(b) by 204 days.

(21) Appl. No.: 13/438,284

(22) Filed: Apr. 3, 2012

(65) Prior Publication Data

US 2012/0247849 A1 Oct. 4, 2012

(30) Foreign Application Priority Data

Apr. 4, 2011 (JP) ................................. 2011-082426
Mar. 14, 2012 (JP) ................................. 2012-056726

(51) Int. Cl.
*B60K 11/04* (2006.01)
*B60R 19/52* (2006.01)

(52) U.S. Cl.
CPC ..................................... *B60K 11/04* (2013.01)
USPC ........................................ 180/68.6; 180/68.4

(58) Field of Classification Search
CPC .............................. B60K 11/04; B60R 19/52
USPC ............................................... 180/68.4, 68.6
See application file for complete search history.

(56) References Cited

U.S. PATENT DOCUMENTS

2008/0308333 A1* 12/2008 Kapadia et al. .............. 180/68.4
2009/0159353 A1* 6/2009 Kerkewitz ................... 180/68.4

FOREIGN PATENT DOCUMENTS

JP 64-6123 U 1/1989
JP 2006-21700 A 1/2006

* cited by examiner

*Primary Examiner* — Hau Phan
*Assistant Examiner* — Bryan Evans
(74) *Attorney, Agent, or Firm* — Foley & Lardner LLP (57) ABSTRACT A heat-exchanger protection structure includes a vehicle-body-side member, a heat exchanger unit, and a plurality of attachment pins. The vehicle-body-side member includes an upper member and a lower member, which have a plurality of attachment holes, respectively. The heat exchanger unit includes a heat exchanger. The attachment pins are attachable on and detachable from the heat exchanger, having a fragile portion capable of being broken when external force larger than a predetermined value acts on the attachment pin. The heat exchanger unit is supported on the vehicle-body-side member by the attachment pins being inserted into the attachment holes. At least one of the fragile portions is broken in case of a vehicle crash to protect the heat exchanger against damage.

23 Claims, 5 Drawing Sheets

FIG. 7

# HEAT-EXCHANGER PROTECTION STRUCTURE

BACKGROUND OF THE INVENTION

1. Field of the Invention

The present invention relates to a heat-exchanger protection structure that protects a heat exchanger, which is mounted on a front portion of a vehicle body, against damage in case of a vehicle crash.

2. Description of the Related Art

A conventional heat-exchanger protection structure is disclosed in Japanese patent Application Laid-Open Publication NO. 2006-21700 and Japanese Utility Model Laid-Open Publication No. 64-6123.

In the former conventional heat-exchanger protection structure, left and right stays fixed on a bumper reinforcement extend in a downward and backward direction of a motor vehicle to have a lower clearance between the stays and a lower portion of a heat exchanger unit. The lower clearance is set shorter than an upper clearance between the bumper reinforcement and the heat exchanger unit. When external force larger than a predetermined value acts on the heat exchanger in the backward direction, one of lower and upper portions of the heat exchanger unit becomes separated from a heat-exchanger supporting panel that supports the heat exchanger unit.

On the other hand, when the bumper reinforcement moves and/or deforms in the backward direction due to a slight collision, the bumper stay moves backward to contact with a lower tank of the heat exchanger unit, releasing the lower portion of the heat exchanger unit from the heat-exchanger supporting panel. This avoids the heat exchanger unit from interference with the bumper reinforcement.

In the latter conventional heat-exchanger protection structure, a plurality of attachment pins or brackets are respectively formed on an upper tank and a lower tank of a heat exchanger as one unit made of plastic material to fix the heat exchanger on a motor-vehicle body frame. The attachment pins/brackets have a fragile portion that is capable of being broken so that damage does not reach the tank when the excessive external force acts on the attachment pins/brackets in case of a vehicle crash.

However, the above known conventional heat-exchanger protection structures have the following problems.

In the former protection structure, the heat exchanger is supported on the heat-exchanger supporting panel as follows.

A lower member of the heat-exchanger supporting panel is formed with two attachment holes for supporting the heat exchanger and two engagement holes for engaging clips. The attachment holes have a U-letter shape. Attachment pins formed on the lower portion of the heat exchanger are inserted into the attachment holes through an elastic insulator, and then the clips are engaged with the lower member to block the openings of the attachment holes.

This structure causes problems in that its manufacturing costs become high, manufacturing processes increase, and variation in support stiffness and faulty engagement of the heat exchanger and the heat-exchanger supporting panel occurs.

In the latter protection structure, the fragile portion of the attachment pin/bracket is broken in case of a vehicle crash to avoid the tank from being damaged. Consequently, the tank can avoid from leakage, but the tank with the broken attachment pin/bracket cannot be reused.

This causes problem in that its repair cost becomes higher.

It is, therefore, an object of the present invention to provide a heat-exchanger protection structure which overcomes the foregoing drawbacks and can surely support a heat exchanger with little variation in support stiffness with low manufacturing cost and avoid the heat exchanger from being damaged in case of a vehicle crash to decrease its repair cost.

SUMMARY OF THE INVENTION

According to a first aspect of the present invention there is provided a heat-exchanger protection structure including a vehicle-body-side member, a heat exchanger unit, and a plurality of attachment pins. The vehicle-body-side member includes an upper member and a lower member, where the upper member and the lower member are provided with a plurality of attachment holes. The heat exchanger unit includes a heat exchanger. The attachment pins are configured to be formed separately from the heat exchanger so that the attachment pins are attachable on and detachable from the heat exchanger. The attachment pins have a fragile portion capable of being broken when external force larger than a predetermined value acts on the attachment pin. The heat exchanger unit is supported on the vehicle-body-side member by the attachment pins being inserted into the attachment holes, thereby at least one of the fragile portions being broken in case of a vehicle crash to protect the heat exchanger against damage.

Therefore, the heat-exchanger protection structure can surely support a heat exchanger with little variation in support stiffness and avoid the heat exchanger from being damaged in case of a vehicle crash. Consequently, manufacturing costs and repair cost of the heat exchanger protection structure can be decreased.

Preferably, the attachment pins include a pin portion extending vertically from a heat exchanger side of the attachment pin when the attachment pins are attached on the heat exchanger, and the fragile portion is formed on a root portion of the pin portion on the periphery of the attachment hole.

Therefore, the fragile portion can be surely broken at a supporting position of at least one of the upper member and the lower member when external force larger than a predetermined value. This allows the heat exchanger to move relative to the upper member and the lower member, so that the heat exchanger can avoid from damage.

Preferably, the pin portion is formed like a hollow pillar.

Therefore, in case where an elastic insulator is provided between the pin portion and the upper/lower member, the fragile portion of the pin portion can be surely broken even when the elastic insulator elastically deforms due to the external force larger than the predetermined value.

Preferably, the attachment pins have an engagement portion that is connected with the pin portion and capable of being engaged with an engagement portion of the heat exchanger.

Therefore, the attachment pins can be easily attached on the heat exchanger, and they can be easily detached from the heat exchanger in case where the attachment pins are broken. This decreases manufacturing processes, manufacturing costs and repair cost. The engagement portion can be larger than the pin portion to surely fix the attachment pins on the heat exchanger, suppressing a variation of support stiffness and faulty support.

Preferably, the engagement portions of the attachment pins are engaged with the engagement portions of the heat exchanger at a front side portion and a rear side portion of the heat exchanger.

Therefore, the attachment pins can be surely engaged with the heat exchanger when the external force less than the predetermine value acts on the attachment pins. In addition, the attachment pins can be disengaged from the heat exchanger due to elastic deformation of the engagement portions and the attachment pins can be replaced by new ones.

Preferably, the attachment pins include a pull-out handle portion to form a clearance for a working space between the pull-out handle portion and the heat exchanger.

Therefore, a worker can easily disengage the attachment pins from the heat exchanger by pulling the pull-out handle portion in case of repair.

Preferably, the pull-out handle portion is longer in a front and rear direction than a width of the heat exchanger.

Therefore, a worker can easily grip the pull-out handle portion to pull it.

Preferably, the heat-exchanger protection structure further includes a bumper reinforcement arranged in front of the vehicle-body-side member and the heat exchanger, and external-force transmitting members provided on at least one of the bumper reinforcement and the heat exchanger unit at both end portions of the at least one. The external-force transmitting members have a clearance relative to the other of the bumper reinforcement and the heat exchanger unit, and the external-force transmitting members are configured to contact with the other in case of a vehicle crash.

Therefore, the external-force transmitting members can surely transmit external force from the bumper reinforcement to the heat exchanger unit in case of a vehicle crash including a head-on crash and an offset crash (a diagonal front crash).

BRIEF DESCRIPTION OF THE DRAWINGS

The objects, features and advantages of the present invention will become apparent as the description proceeds when taken in conjunction with the accompanying drawings, in which.

DETAILED DESCRIPTION OF THE PREFERRED EMBODIMENTS

Throughout the following detailed description, similar reference characters and numbers refer to similar elements in all figures of the drawings, and their descriptions are omitted for eliminating duplication. In the following description, the term "right" and "left" mean "right" and "left" of a vehicle body, not those in the drawings.

Figure 1:
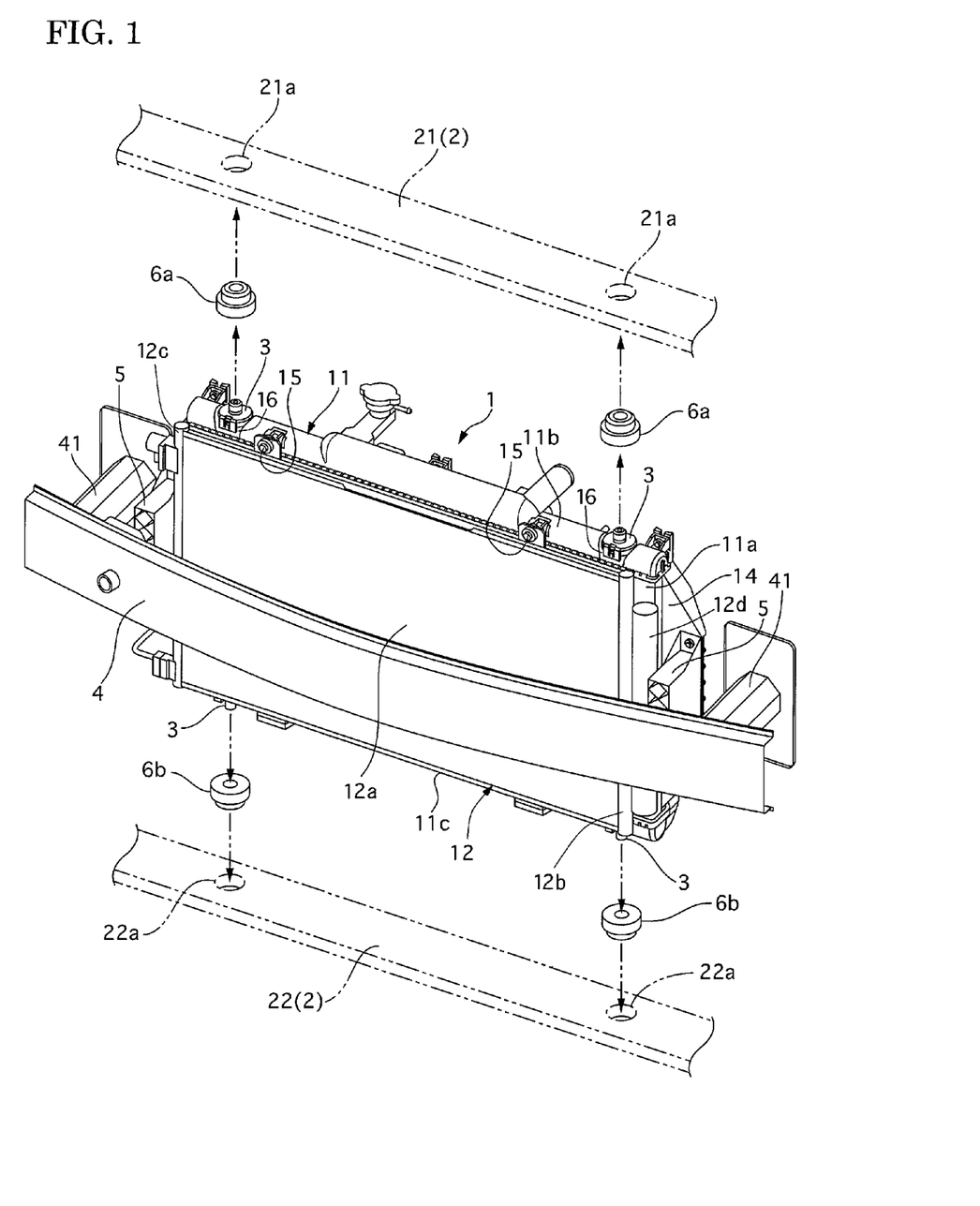
FIG. 1 is a perspective view showing a heat-exchanger protection structure of a first embodiment according to the present invention.
Figure 2:
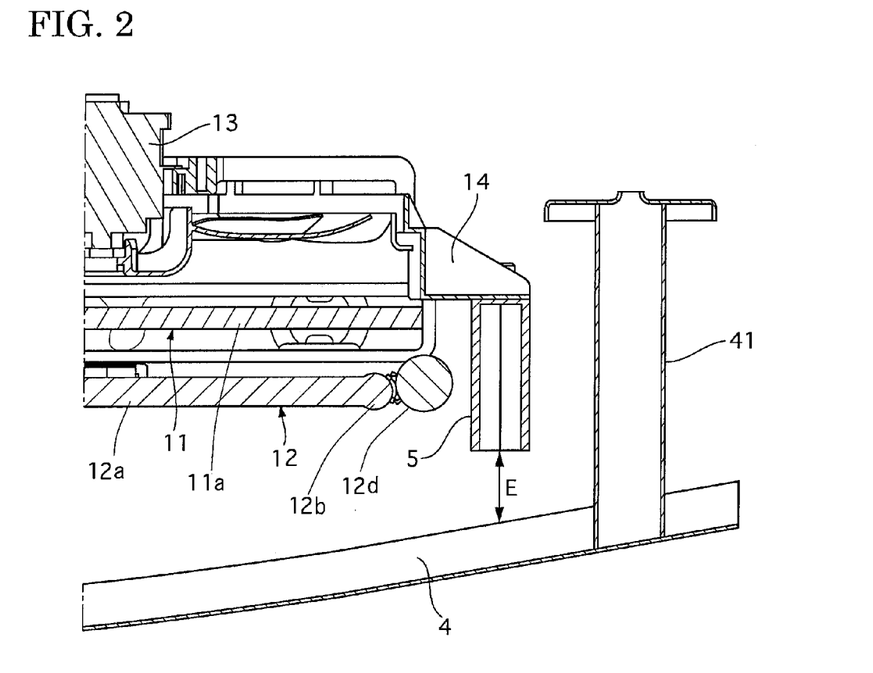
FIG. 2 is an enlarged cross sectional plane view of a left portion of the heat-exchanger protection structure of the first embodiment.

Referring to FIG. 1 and FIG. 2, there is shown a first preferred embodiment of a heat-exchanger protection structure according to the present invention. The heat-exchanger protection structure is located on a front portion of a motor vehicle body. The structure includes a heat exchanger unit 1, a heat-exchanger supporting member 2, four attachment pins 3, a bumper reinforcement member 4, and external-force transmitting members 5.

The heat exchanger unit 1 is composed of a radiator 11, a condenser 12, a cooling fan unit 13, a fan shroud 14, and others. The condenser 12 is arranged at the rear side of the condenser 12, and it is fixed by bolts 15 and supported on the radiator 11. The fan shroud 14 is fixed on the rear side of the radiator 11 by not-shown bolts, being formed with a through-hole at the center thereof. The cooling fan unit 13 is arranged in the through-hole of the fan shroud 14.

The radiator 11 corresponds to a heat exchanger of the present invention.

Figure 3:
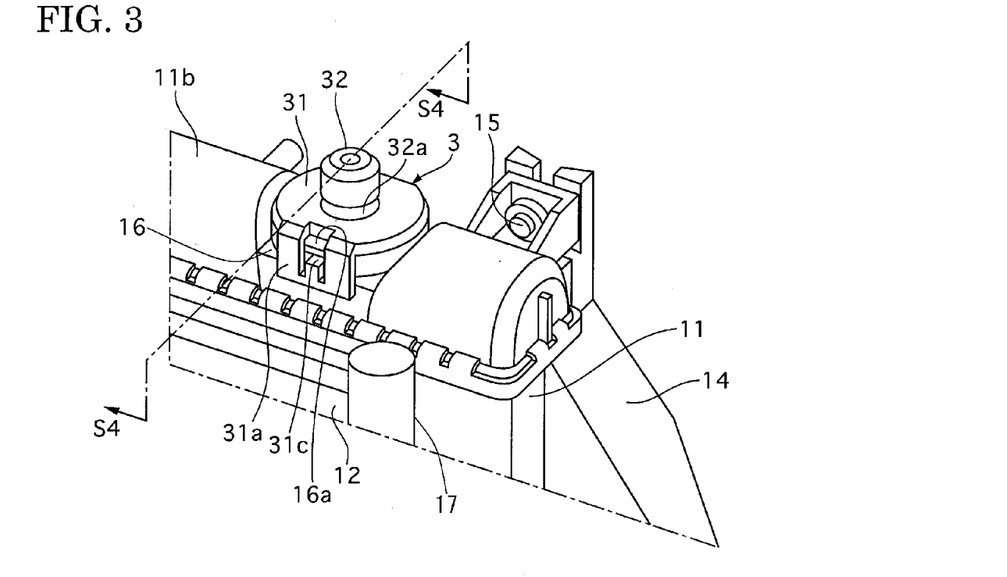
FIG. 3 is an enlarged perspective view of a left top portion of the heat-exchanger protection structure of the first embodiment.

The radiator 11 is fluidically connected by not-shown hoses with a not-shown engine to cool water that circulates between the radiator 11 and the engine. The radiator 11 has a radiator core 11a, an upper radiator tank 11b and a lower radiator tank 11c. The radiator core 11a includes a plurality of tubes extending in the vertical direction to be connected with the upper radiator tank 11b and the lower radiator tank 11c, and a plurality fins each disposed between the adjacent tubes. The upper and lower radiator tanks 11b and 11c are formed like a half pillar to have an inner space where the water accumulates and flows. The upper and lower radiator tanks 11b and 11c are respectively provided on external surfaces thereof near the both end portions thereof with upper and lower engagement portions 16, with which attachment pins 3 are respectively engaged as shown in FIG. 3 and FIG. 4.

Figure 4:
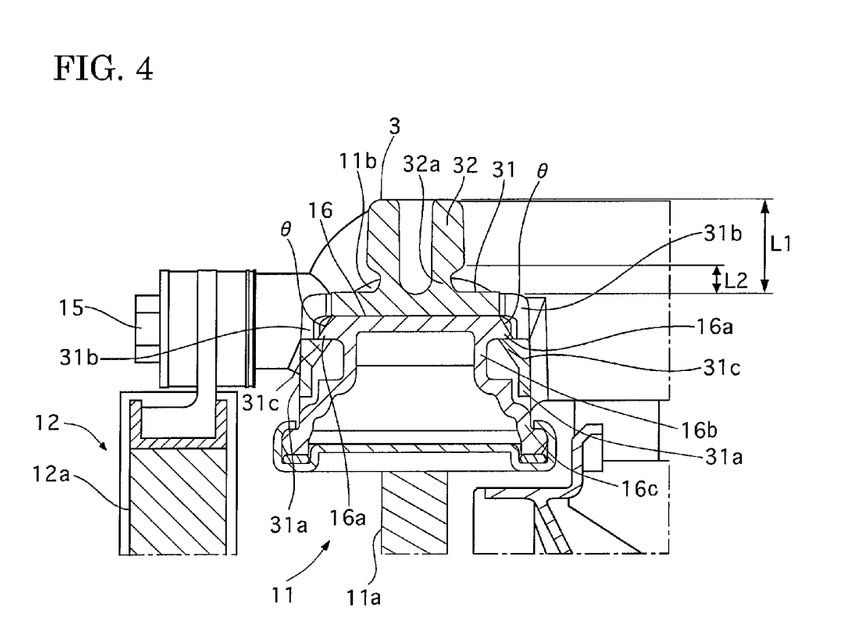
FIG. 4 is an enlarged cross sectional side view, taken along the line S4-S4 in FIG. 3, of the top portion of the heat-exchanger protection structure of the first embodiment.

FIG. 4 shows a cross sectional view of the upper engagement portions 16, which are formed like a recess on the upper radiator tank 11b. The top portions 16a of the upper engagement portions 16 have a flat surface at their top sides, being smaller in height than a top surface of the upper radiator tank 11b. The top portions 16a are projected in the both front and rear directions of the radiator 11, when the radiator 11 is installed on the vehicle body, relative to their continued intermediate portions 16b formed between the top portions 16a and bottom portions 16c. The top portions 16a function as an engagement portion that is engageable with the attachment pin 3.

The lower engagement portions 16 have the configuration similar to the upper engagement portions 16, while they are provided upside down.

The condenser 12 is used for a not-shown air condition system that regulates the temperature of the air in a passenger compartment. It has a core part 12a, a left condenser tank 12b, a right condenser tank 12c, and a receiver tank 12d. The core part 12a includes a plurality of tubes extending in the horizontal direction to connect with the left and right condenser tanks 12b and 12c, and a plurality of fins each arranged between the adjacent tubes. The interior of the left condenser tank 12b is connected with the receiver tank 12d.

As shown in FIG. 1, the heat-exchanger supporting member 2 is illustrated by dashed-two dotted lines. The heat-exchanger supporting member 2 includes an upper member 21, a lower member 22, and not-shown left and right side members. The upper member 21 and the lower member 22 extend in the lateral direction of the vehicle body, being arranged parallel to each other. The left side member extends vertically to connect the left end portions of the upper and lower members 21 and 22 with each other, and the right side member extends vertically to connect the right end portions of the upper and lower members 21 and 22.

The upper member 21 is provided with two engagement holes 21a apart from each other in the lateral direction, and the lower member 22 is provided with two engagement holes 22a apart from each other in the lateral direction.

The heat-exchanger supporting member 2 corresponds to a vehicle-body-side member of the present invention.

The attachment pins 3 are detachably attached on the engagement portions 16 of the upper radiator tank 11 and the lower radiator tank 12, respectively. The upper-side attachment pins 3 are inserted into the engagement holes 21a of the upper member 21 through insulators 6a made of elastic material, and the lower-side attachment pins 3 are inserted into the engagement holes 22a of the lower member 22 through insulators 6b made of elastic material, thereby elastically supporting the heat exchanger unit 1 on the heat-exchanger supporting member 2.

As shown in FIG. 3 and FIG. 4, the attachment pins 3 are constructed to have an engagement portion 31 and a pin portion 32.

The engagement portion 31 has a disc-like portion and two engagement leg portions 31a projecting vertically from the disc-like portion. The inner surface of the disc-like portion is placed on the top surface of the top portion 16a of the engagement portion 16 of the tank 11 (and the tank 12). The engagement leg portions 31a are provided with a window portion 31b and an inwardly projecting portion 31c to be elastically engaged with the top portion 16a, which functions as the engagement portion, of the engagement portion 16. The engagement leg portions 31a are located at a front side and a rear side of the engagement portion 16 when the attachment pins 3 are engaged with the tank 11 (and the tank 12). The edge portions of the top portions 16 have a slanted surface θ so that the engagement leg portions 31c with the inwardly projecting portions 31c can be smoothly engaged with the top portion 16a of the engagement portion 16.

The pin portion 32 is formed like a hollow pillar that has a bottom at the engagement-portion side. It projects vertically from the engagement portion 31, having a small diameter portion 32a at/near a root portion of the pin portion 32.

The small diameter portion 32a faces the attachment hole 21a (22a), having an axial length L2 slightly longer than the depth of the attachment hole 21a (22a). Accordingly, the small diameter portion 32a projects slightly beyond the upper member 21 (the lower member 22) when the attachment pins 3 are attached to the upper member 21 and the lower member 22.

The small diameter portion 32a is set to be broken when external force larger than the predetermined value acts on the pin portion 32. The predetermined value is set to be slightly smaller than the value generated when the bumper reinforcement 4 deforms and moves rearward to deform the heat exchanger in case of a vehicle crash. The small diameter portion 32a corresponds to a fragile portion of the present invention.

The hollow has an axial length L1 where the hollow extends slightly deeper beyond the top surface of the engagement portion 31.

As shown in FIG. 1 and FIG. 2, the bumper reinforcement 4 is fixed to a not shown front portion of the vehicle body through left and right bumper stays 41 that are provided at the both end portions of the bumper reinforcement 4. The bumper reinforcement 4 is placed in front of and independently from the heat exchanger unit 1, being away from the unit 1.

The left and right external-force transmitting members 5 are fixed on the both left and right end portions of the fan shroud 14, respectively. The front end portions of the external force transmitting members 5 are a predetermined length E apart from the bumper reinforcement 4. The length E is set such that the bumper reinforcement 4 does not contact with the heat exchanger unit 1 when the bumper reinforcement 4 moves rearward in case of a vehicle crash. The external-force transmitting members 5 function to transmit external force through the bumper reinforcement 4 to the fan shroud 14 of the heat exchanger unit 1 to break the attachment pin/pins 3.

The operation of the heat exchanger protection structure of the first embodiment will be described.

Figure 5A:
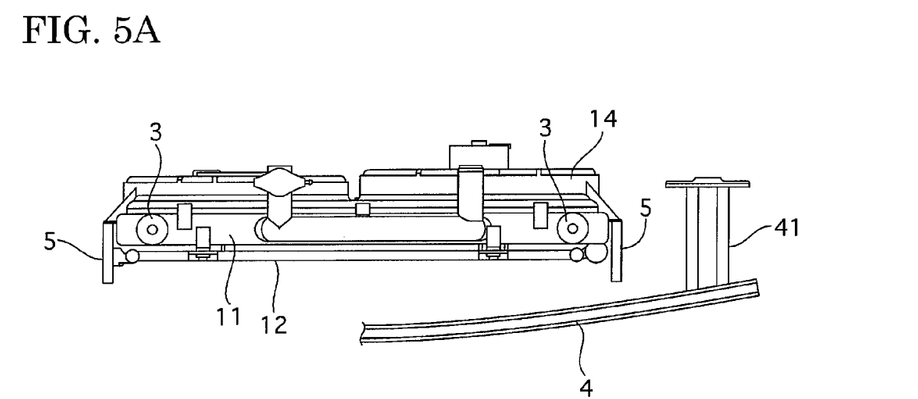
FIG. 5A is a plane view of the heat-exchanger protection structure of the first embodiment in a normal state.

In a normal state where external force does not substantially act on the bumper reinforcement 4, the proper clearance (the length E) is maintained between the external-force transmitting members 5 and the bumper reinforcement 4 as shown in FIG. 5A.

Figure 5B:
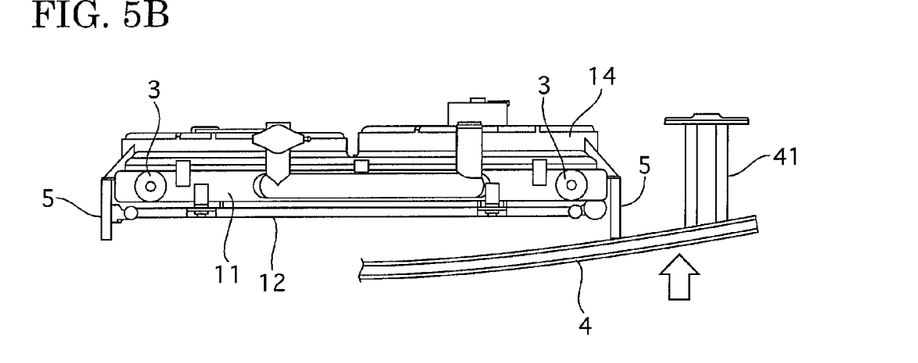
FIG. 5B is a plane view of the heat-exchanger protection structure of the first embodiment in a state where a bumper reinforcement moves rearward and contacts with an external-force transmitting member in case of a vehicle crash.

In case of an offset vehicle crash in a left anterior oblique direction, external force acts on the left front portion of the bumper reinforcement 4. The external force deforms and moves the left portion of the bumper reinforcement 4 rearward. The clearance becomes smaller, and then the bumper reinforcement 4 contacts with the front end portion of the left external-force transmitting member 5 as shown in FIG. 5B. In this state, the bumper reinforcement 4 does not contact with the radiator 11 and the condenser 12.

Figure 5C:
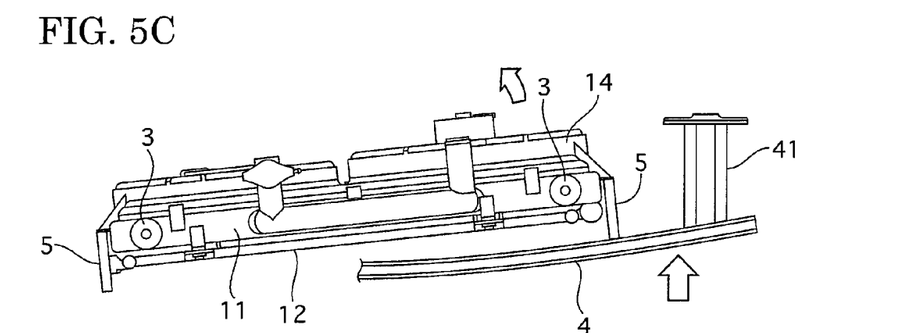
FIG. 5C is a plane view of the heat-exchanger protection structure of the first embodiment in a state where an attachment pin is broken by the external force so that the heat exchanger moves rearward.

As the bumper reinforcement 4 further moves rearward, the left side end portion of the fan shroud 14 is pressed rearward through the left external-force transmitting member 5, and accordingly the external force starts to act on the left attachment pins 3. As a result, the small diameter portions 32a of the left attachment pins 3 break. This releases connection between the left portion of the heat exchanger unit 1 and the heat-exchanger supporting member 2, so that the left portion of the heat exchanger unit 1 moves rearward as shown in FIG. 5C. Accordingly, the heat exchanger unit 1 can avoid the excessive external force from deforming the heat exchanger unit 1.

Incidentally, when the external force is larger, the small diameter portions of the right attachment pins 3 break after those of the left attachment pins 3 break. In this state, the heat exchanger unit 1 becomes free from the heat-exchanger supporting member 2, avoiding from damage.

In the breakage of the small diameter portions 32a, they are formed at/near the root portions of the pin portions 32, and they project slightly beyond the top surfaces of the upper and lower member 21 and 22. Therefore, they break at/near the top surfaces of the upper and lower member 21 and 22. This ensures the small diameter portions 32a to break, thereby protecting the heat exchanger unit 1.

In addition, the pin portions 32 have the hollow that extends beyond the top surfaces of the engagement portions 31. This ensures the pin portions 32 to break even when the elastic insulators 6a are provided between the pin portions 32 and the engagement holes 21a, 22a and they elastically deform due to the external force.

In case of an offset vehicle crash in a right anterior oblique direction, the right small diameter portions 32a break similarly to the case of the vehicle crash in the left anterior oblique direction, although "left" and "right" are changed to each other.

Therefore, the heat exchanger unit 1 can be protected from damage in case of vehicle crashes in any direction.

After the attachment pins 3 are broken, they are removed from the radiator 11 and replaced by new attachment pins. This repair can be easily done, and its repair cost is low.

In order to engage the new attachment pins 3, they are pressed on the engagement portions 16 to engage the window portions 31b with the top portions 16a of the engage portion 16 of the radiator 11. This attachment work can be easily done.

The heat exchanger protection structure of the first embodiment has the following advantages.

The heat exchanger unit 1 is fixed on the heat-exchanger supporting member 2 by using the attachment pins 3 that is made independently from the heat exchanger unit 1 to be attachable to and detachable from the heat radiator unit 1. Therefore, the attachment pins 3 break to allow the heat exchanger unit 1 to move relative to the heat-exchanger supporting member 2 in case of a vehicle crash, so that the heat exchanger such as the radiator 11 and the condenser 12 can avoid from damage. In repair, the attachment pins 3 are replaced to new ones without changing the heat exchanger. This decreases repair cost.

The attachment pins 3 have the small diameter portion 32a functioning a fragile portion at/near their root portions. Therefore, the attachment pins 3 can surely break at the small diameter portions when the external force larger than the predetermined value.

The pin portions 32 of the attachment pins 3 are formed with the hollow that extends beyond the top surface of the portions with the attachment holes 21a, 22a. Therefore, the attachment pins 3 can surely break even when the elastic insulators are disposed in the attachment holes 21a, 22a to surround the pin portions 32.

The engagement portions 31 have two engagement leg portions 31a with the window portion 31b and the inwardly projecting portion 31c are elastically engaged with the top portion 16a functioning as the engagement portion at the front side and the rear side of the tank 11b, 11c. Therefore, the attachment pins 3 can be surely engaged with the radiator 11 when the external force less than the predetermine value acts on the attachment pins 3. In addition, the attachment pins 3 can be disengaged from the radiator 11 due to elastic deformation of the engagement portions 31 and the attachment pins 3 can be replaced by new ones.

The external-force transmitting members 5 are provided on the fan shroud 14 in such a way that the front portions and the bumper reinforcement have the clearance therebetween. Therefore, the external-force transmitting members 5 can surely transmit the external force from the bumper reinforcement 4 to the heat exchanger unit 1 in case of a vehicle crash including a head-on crash and an offset crash (a diagonal front crash).

Next, a heat-exchanger protection structure of a second according to the present invention will be described.

Figure 6:
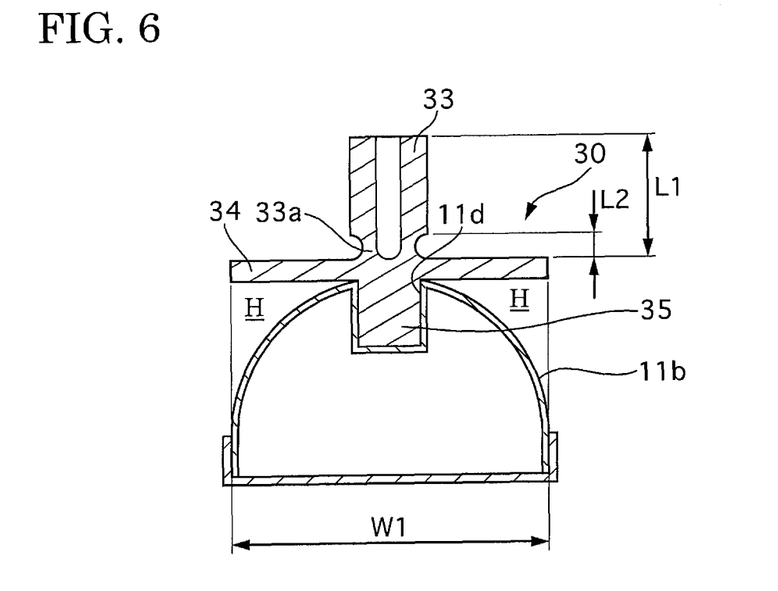
FIG. 6 is a cross sectional side view of an attachment pin and a tank of a heat exchanger that are used in a heat-exchanger protection structure of a second embodiment according to the present invention.

FIG. 6 shows an attachment pin 3 and a tank of a heat exchanger unit of a heat exchanger protection structure of a second embodiment according to the present invention.

The attachment pin 30 has a pin portion 33, a pull-out handle portion 34, and an engagement portion 35.

The pin portion 33 is formed like a hollow pillar having a small diameter portion 33a at/near a root portion of the pin portion 33 similarly to those of the pin portions 32 of the first embodiment.

The pull-out handle portion 34 is formed like a plate extending in a front and rear direction so that a worker can inset his or her fingers in front and rear spaces H between the pull-out handle portion 34 and an outer surface of a radiator tank 11b. The length of the pull-out handle portion 34 is approximately equal to the width W1 of the radiator tank 11b.

The engagement portion 35 projects toward the radiator tank 11b from the pull-out handle portion 34 in a direction oppose to the pin portion 33. The engagement portion 35 is inserted into an engagement recess portion 11d formed on the top portion of the radiator tank 11b.

The other parts and portions are constructed similarly to those of the first embodiment.

The heat exchanger protection structure of the second embodiment functions similarly to the first embodiment.

In addition, the pull-out handle portion 34 and the engagement portion 35 remain, although the pin portion 33 is separated from the pull-out handle portion 34 and the engagement portion 35, after a vehicle crash because the attachment pin 30 breaks at the small diameter portion 33a.

A worker can insert his or her fingers into the spaces H between the pull-out handle portion 34 and the outer surface of the radiator tank lib, and pull up the pull-out handle portion 34, griping the pull-out handle portion 34. Therefore, the broken attachment pin 3 can be easily removed from the radiator tank 11b and replaced to new one.

Figure 7:
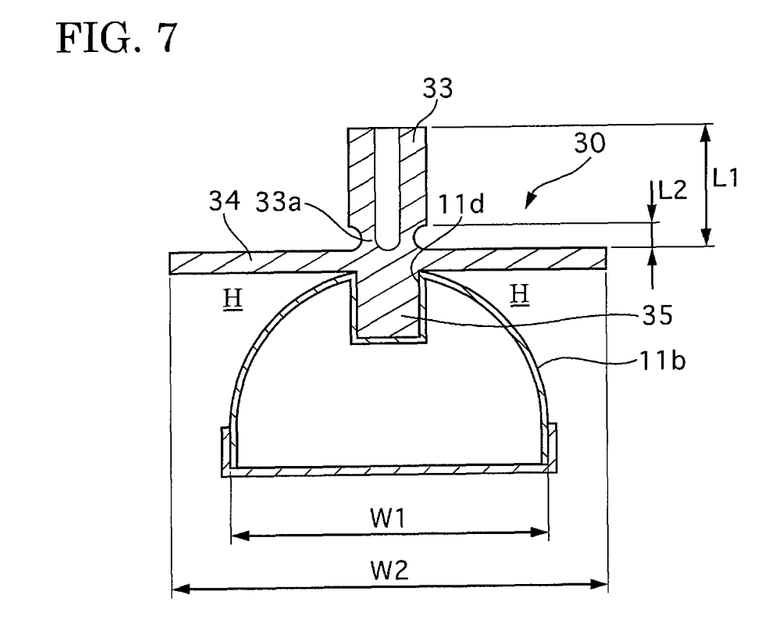
FIG. 7 is a cross sectional side view of an attachment pin and a tank of a heat exchanger that are used in a heat-exchanger protection structure of a modification of the second embodiment.

FIG. 7 shows a modification of the second embodiment.

In the modification, the length W2 of the pull-out handle portion 34 is set longer than the width W1 of the radiator tank 11b.

Therefore, a worker can more easily grip the pull-out handle portion 34. The pull-out handle portion 34 extends in a front and rear direction of a vehicle body when a heat exchanger unit with the attachment pins 3 is installed on the vehicle body. This can easily avoid interference between the pull-out handle portion 34 and the radiator tank 11b.

While there have been particularly shown and described with reference to preferred embodiments thereof, it will be understood that various modifications may be made therein, and it is intended to cover in the appended claims all such modifications as fall within the true spirit and scope of the invention.

For example, the fragile portions of the attachment pins may have configuration different from the embodiments where they are formed by a circular groove.

Engagement of attachment pins and a heat exchanger may be changed appropriately.

The external-force transmitting members 5 can be provided on the bumper reinforcement 4 instead of the fan shroud 14.

The cross sectional profile of the hollow pillar may be set appropriately.

The entire contents of Japanese Patent Applications No. 2011-082426 filed Apr. 4, 2011 and No. 2012-056729 filed Mar. 14, 2012 are incorporated herein by reference.

What is claimed is:

1. A heat-exchanger protection structure comprising:
a vehicle-body-side member including an upper member and a lower member, the upper member and the lower member being provided with a plurality of attachment holes;
a heat exchanger unit including a heat exchanger; and a plurality of attachment pins configured to be formed separately from the heat exchanger so that the attachment pins are attachable on and detachable from the heat exchanger, each attachment pin from the plurality of attachment pins having a fragile portion that is capable of being broken when external force larger than a predetermined value acts on the respective attachment pin, wherein the heat exchanger unit is supported on the vehicle-body-side member by the attachment pins being inserted into the attachment holes, wherein at least one of the fragile portions is configured to be broken in case of a vehicle crash to protect the heat exchanger against damage, wherein each attachment pin from the plurality of attachment pins includes a pin portion extending in one direction and engagement leg portions projecting in an opposite direction, wherein the engagement leg portions are respectively provided with a window portion and an inwardly projecting portion which is formed continuously on the window portion, and wherein the plurality of attachment pins are each attached on an engagement portion of the heat exchanger via the inwardly projecting portion.

2. The heat-exchanger protection structure according to claim 1, wherein the fragile portion of each attachment pin from the plurality of attachment pins is formed on a root portion of the respective pin portion at a periphery of the respective attachment hole.

3. The heat-exchanger protection structure according to claim 2, wherein the pin portion is formed like a hollow pillar.

4. The heat-exchanger protection structure according to claim 3, wherein the engagement lea portions of each attachment pin from the plurality of attachment pins are engaged with the respective engagement portions of the heat exchanger at a front side portion of the heat exchanger and a rear side portion of the heat exchanger.

5. The heat-exchanger protection structure according to claim 4, wherein each attachment pin from the plurality of attachment pins includes a pull-out handle portion, that is provided closer to the heat-exchanger than the fragile portion, to form a clearance for a working space between the pull-out handle portion and the heat exchanger.

6. The heat-exchanger protection structure according to claim 5, wherein the pull-out handle portion is longer in a front-and-rear direction than a width of the heat exchanger.

7. The heat-exchanger protection structure according to claim 5, further comprising:
a bumper reinforcement arranged in front of the vehicle-body-side member and the heat exchanger; and
external-force transmitting members provided on at least one of the bumper reinforcement and the heat exchanger unit at both end portions of the at least one of the bumper reinforcement and the heat exchanger unit,
wherein clearances are formed between the external-force transmitting members and the other of the bumper reinforcement and the heat exchanger unit, and
wherein the external-force transmitting members are configured to contact with the other of the bumper reinforcement and the heat exchanger unit in the case of the vehicle crash.

8. The heat-exchanger protection structure according to claim 2, further comprising:
a bumper reinforcement arranged in front of the vehicle-body-side member and the heat exchanger; and
external-force transmitting members provided on at least one of the bumper reinforcement and the heat exchanger unit at both end portions of the at least one of the bumper reinforcement and the heat exchanger unit,
wherein clearances are formed between the external-force transmitting members and the other of the bumper reinforcement and the heat exchanger unit, and
wherein the external-force transmitting members are configured to contact with the other of the bumper reinforcement and the heat exchanger unit in the case of the vehicle crash.

9. The heat-exchanger protection structure according to claim 3, further comprising:
a bumper reinforcement arranged in front of the vehicle-body-side member and the heat exchanger; and
external-force transmitting members provided on at least one of the bumper reinforcement and the heat exchanger unit at both end portions of the at least one of the bumper reinforcement and the heat exchanger unit,
wherein clearances are formed between the external-force transmitting members and the other of the bumper reinforcement and the heat exchanger unit, and
wherein the external-force transmitting members are configured to contact with the other of the bumper reinforcement and the heat exchanger unit in the case of the vehicle crash.

10. The heat-exchanger protection structure according to claim 2, wherein the engagement leg portions of each attachment pin from the plurality of attachment pins are engaged with the respective engagement portions of the heat exchanger at a front side portion of the heat exchanger and a rear side portion of the heat exchanger.

11. The heat-exchanger protection structure according to claim 10, wherein each attachment pin from the plurality of attachment pins includes a pull-out handle portion, that is provided closer to the heat-exchanger than the fragile portion, to form a clearance for a working space between the pull-out handle portion and the heat exchanger.

12. The heat-exchanger protection structure according to claim 11, wherein the pull-out handle portion is longer in a front-and-rear direction than a width of the heat exchanger.

13. The heat-exchanger protection structure according to claim 11, further comprising:
a bumper reinforcement arranged in front of the vehicle-body-side member and the heat exchanger; and
external-force transmitting members provided on at least one of the bumper reinforcement and the heat exchanger unit at both end portions of the at least one of the bumper reinforcement and the heat exchanger unit,
wherein clearances are formed between the external-three transmitting members and the other of the bumper reinforcement and the heat exchanger unit, and
wherein the external-force transmitting members are configured to contact with the other of the bumper reinforcement and the heat exchanger unit in the case of the vehicle crash.

14. A heat-exchanger protection structure comprising:
a vehicle-body-side member including an upper member and a lower member, the upper member and the lower member being provided with a plurality of attachment holes;
a heat exchanger unit including a heat exchanger; and
a plurality of attachment pins configured to be formed separately from the heat exchanger so that the attachment pins are attachable on and detachable from the heat exchanger, each attachment pin from the plurality of attachment pins having a fragile portion that is capable of being broken when external force larger than a predetermined value acts on the respective attachment pin, wherein the heat exchanger unit is supported on the vehicle-body-side member by the attachment pins being inserted into the attachment holes, wherein at least one of the fragile portions is configured to be broken in case of a vehicle crash to protect the heat exchanger against damage, wherein each attachment pin from the plurality of attachment pins includes a pull-out handle portion, that is provided closer to the heat-exchanger than the fragile portion, to form a clearance thr a working space between the pull-out handle portion and the heat exchanger.

15. The heat-exchanger protection structure according to claim 14, wherein the pull-out handle portion is longer in a front-and-rear direction than a width of the heat exchanger.

16. The heat-exchanger protection structure according to claim 14, further comprising:
a bumper reinforcement arranged in front of the vehicle-body-side member and the heat exchanger; and
external-three transmitting members provided on at least one of the bumper reinforcement and the heat exchanger unit at both end portions of the at least one of the bumper reinforcement and the heat exchanger unit,
wherein clearances are formed between the external-force transmitting members and the other of the bumper reinforcement and the heat exchanger unit, and
wherein the external-force transmitting members are configured to contact with the other of the bumper reinforcement and the heat exchanger unit in the case of the vehicle crash.

17. A heat-exchanger protection structure comprising:
a vehicle-body-side member including an upper member and a lower member, the upper member and the lower member being provided with a plurality of attachment holes;
a heat exchanger unit including a heat exchanger;
a plurality of attachment pins configured to be formed separately from the heat exchanger so that the attachment pins are attachable on and detachable from the heat exchanger, each attachment pin from the plurality of attachment pins having a fragile portion that is capable of being broken when external force larger than a pre-determined value acts on the respective attachment pin, wherein the heat exchanger unit is supported on the vehicle-body-side member by the attachment pins being inserted into the attachment holes, wherein at least one of the fragile portions is configured to be broken in case of a vehicle crash to protect the heat exchanger against damage;
a bumper reinforcement arranged in front of the vehicle-body-side member and the heat exchanger; and
external-force transmitting members provided on at least one of the bumper reinforcement and the heat exchanger unit at both end portions of the at least one of the bumper reinforcement and the heat exchanger unit at a separation distance in a transverse direction that is larger than a separation distance in the transverse direction between two of the attachment pins at both ends of the heat exchanger unit,
wherein clearances are formed between the external-force transmitting members and the other of the bumper reinforcement and the heat exchanger unit, and
wherein the external-force transmitting members are configured to contact with the other of the bumper reinforcement and the heat exchanger unit in the case of the vehicle crash.

18. The heat-exchanger protection structure according to claim 17, wherein each attachment pin from the plurality of attachment pins has an engagement portion that is connected with a respective pin portion and capable of being engaged with a respective engagement portion of the heat exchanger.

19. The heat-exchanger protection structure according to claim 18, wherein the engagement portions of the attachment pins are engaged with the respective engagement portions of the heat exchanger at a front side portion of the heat exchanger and a rear side portion of the heat exchanger.

20. The heat-exchanger protection structure according to claim 17, wherein each attachment pin from the plurality of attachment pins includes a pull-out handle portion, that is provided closer to the heat-exchanger than the fragile portion, to form a clearance for a working space between the pull-out handle portion and the heat exchanger.

21. The heat-exchanger protection structure according to claim 20, wherein the pull-out handle portion is longer in a front-and-rear direction than a width of the heat exchanger.

22. The heat-exchanger protection structure according to claim 17, wherein each attachment pin from the plurality of attachment pins includes a pin portion extending in one direction and engagement leg portions projecting in an opposite direction,
wherein the engagement leg portions are respectively provided with a window portion and an inwardly projecting portion which is formed continuously on the window portion, and
wherein the plurality of attachment pins are each attached on an engagement portion of the heat exchanger via the inwardly projecting portion.

23. The heat-exchanger protection structure according to claim 1, wherein the engagement leg portions of each attachment pin from the plurality of attachment pins are engaged on outer peripheries of the engagement portions of the heat exchanger.

* * * * *